Patented Mar. 17, 1953

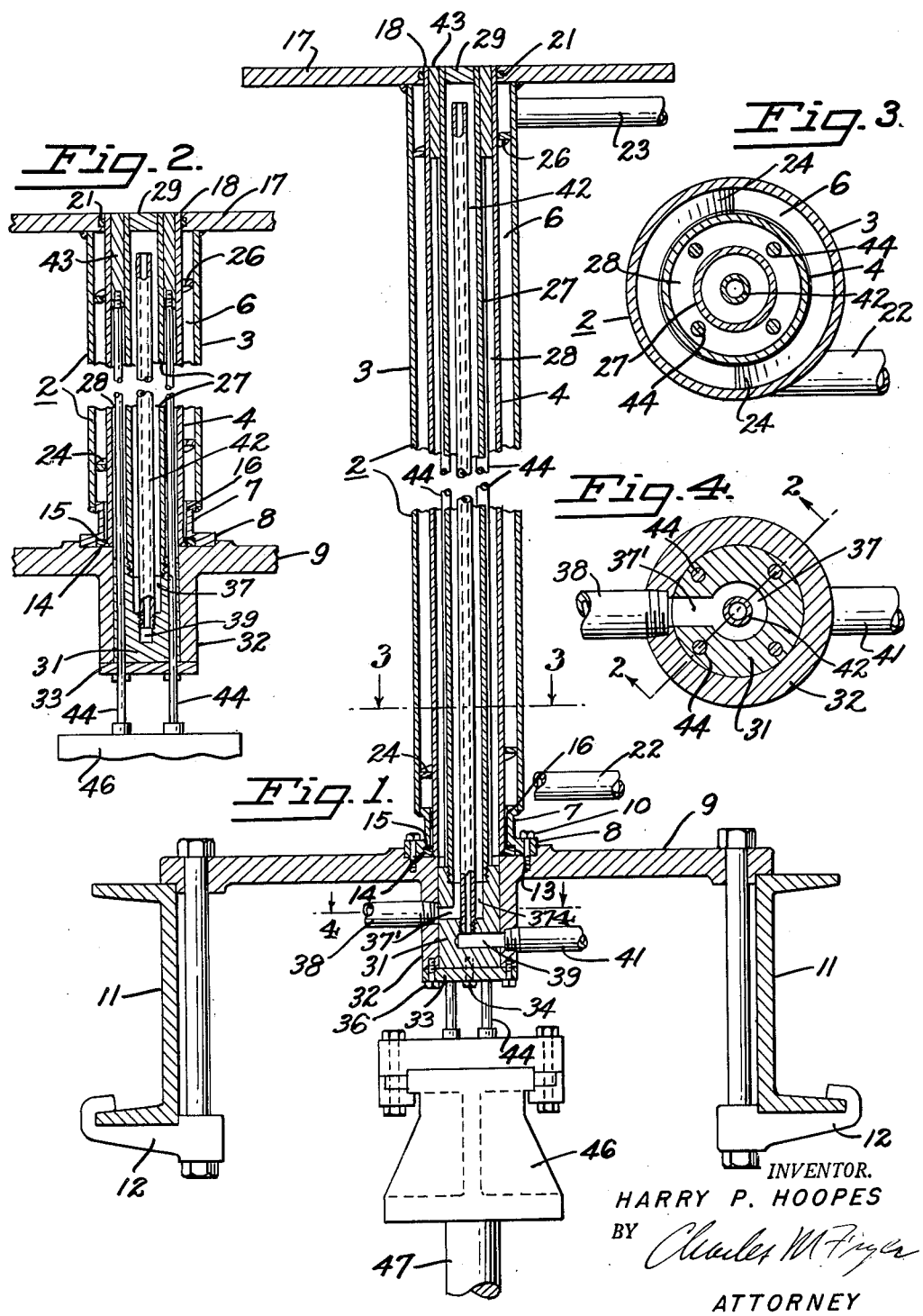

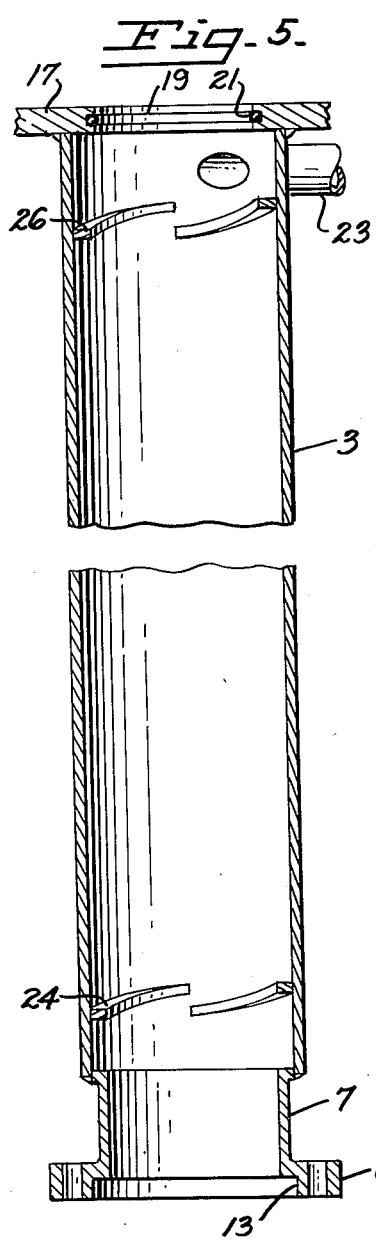
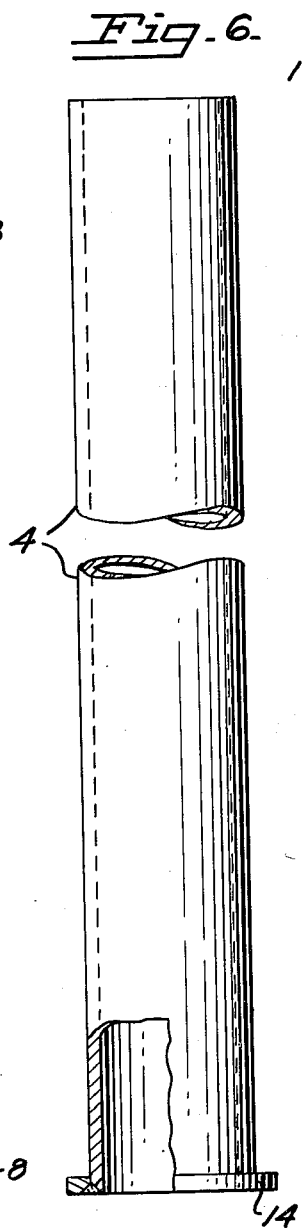
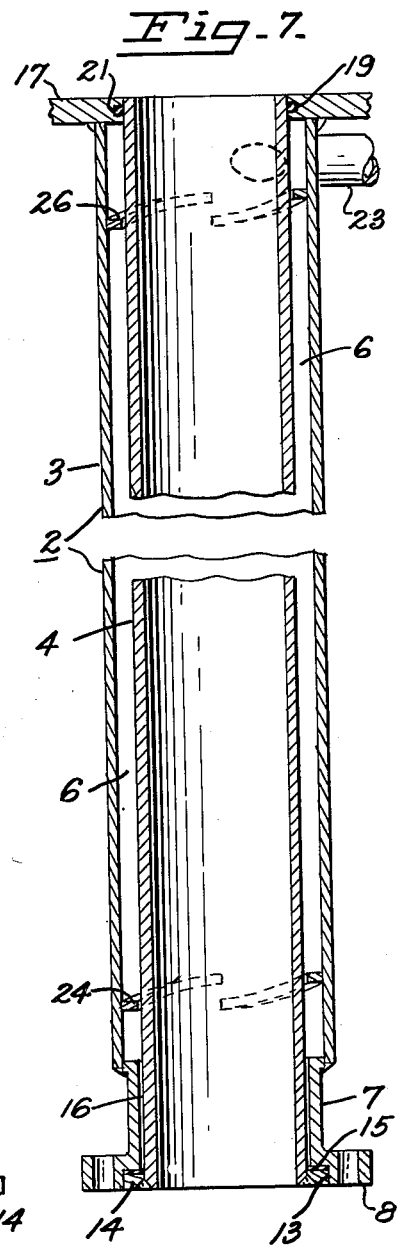

2,631,351

UNITED STATES PATENT OFFICE 2,631,351

APPARATUS FOR MOLDING TUBULAR INSULATION

Harry P. Hoopes, Berkeley, Calif., assignor to Pabco Products Inc., a corporation of Delaware Application October 23, 1950, Serial No. 191,696

7 Claims. (Cl. 25—30)

This invention relates to molding apparatus, and more particularly to such apparatus adapted for the molding of light weight insulating material from an aqueous slurry of the same, such as magnesia insulation or insulation shaped from a slurry containing reactable calcareous-silicious materials, and more particularly to the mold structure of such apparatus facilitating replacement of certain mold parts when required.

Insulating materials of the type described which are particularly adapted for use with the molding apparatus of this invention are disclosed in assignee's Patent No. 2,209,754, dated July 30, 1940, for the production of magnesia insulation, and Patents Nos. 2,432,981, dated December 23, 1947, and 2,483,498, dated October 4, 1949, for the production of insulation made by the reaction of calcareous and silicious materials. In the methods of these patents, the slurry is poured into a mold cavity, and the mold is heated to set the slurry to a firm self-supporting mass in a relatively short time, after which the set mass is ejected from the mold in self-supporting form. In the case of magnesia insulation, the set mass is then dried, while in the case of the reactable calcareous-silicious insulation, it is indurated and then dried.

In the manufacture of tubular pipe covering, the mold comprises a jacket formed of an outer shell and an inner mold liner; heating fluid being circulated through the jacket space between the shell and the liner. A hollow mold core or mandrel is positioned within the liner and spaced therefrom to provide the cylindrical mold cavity between the liner and the core. A heating fluid is also circulated through the core; and a piston is provided to eject the set material from the mold cavity.

Summarizing this invention, it comprises an arrangement wherein the liner is removably mounted in the shell for endwise removal therefrom and insertion therein, so that in case it is necessary to provide a new outer mold surface, the liner need merely be replaced without the necessity of having to provide an entirely new jacket. Also the structure is such as to provide an efficacious arrangement for circulation of the fluid, and ejection of the set material from the mold. Objects of the invention will become apparent from a perusal of the following description thereof.

Referring to the drawing:

Fig. 1 is a vertical sectional view through the portion of the molding apparatus to which this invention relates; the view being broken away to shorten the same;

Fig. 2 is a view similar to Fig. 1 taken in a plane at a 45° angle to Fig. 1 as indicated by section line 2—2 in Fig. 4; portions of the structure being omitted from the view and portions being shown broken away to illustrate more clearly the construction;

Fig. 3 is a horizontal section taken in a plane indicated by line 3—3 in Fig. 1;

Fig. 4 is a horizontal section taken in a plane indicated by line 4—4 in Fig. 1;

Fig. 5 is an enlarged vertical sectional view of the jacket shell; a portion being shown broken away to shorten the view;

Fig. 6 is an enlarged elevational view, partly in section of the liner adapted to be telescoped within the shell; a portion being broken away to shorten the view;

Fig. 7 is an enlarged fragmentary vertical section of the lower end of the relatively telescoped liner and shell.

The mold comprises a jacket 2 which includes outer shell 3 and inner mold liner 4 both of which are tubular shaped in the form of cylinders; a jacket space 6 being formed between shell 3 and liner 4 for circulation of the heating fluid, such as hot water, therethrough. Shell 3 has welded adjacent the lower end thereof a sleeve portion 7 having peripheral flange 8 detachably connected to a base plate 9 by cap screws 10; the base plate being in turn detachably supported on beams 11, by clamping structures 12.

An annular recess 13 is formed in the bottom end of shell 3 adjacent the inside thereof and which is open toward said bottom end to receive an annular flange 14 welded to the lower end of liner 4 so that when the liner is telescoped within the shell, shoulder 14 will be seated in recess 13 and be clamped between base 9 and the lower end of the shell. In this connection, a suitable sealing gasket or packing of rubber or the like in the form of a ring 15 is clamped between flange 14 and the lower end of shell 3 to seal against escape of the heating fluid which is circulated through jacket space 6 in a manner to be described in greater detail.

Clearance 16 is provided between the lower end of shell 3 and liner 4 to permit ready endwise insertion or removal of the liner from the shell. At its upper end, shell 3 is secured, preferably by welding, to a plate 17 which forms part of the hopper (not shown) frame structure; and plate 17 provides a closure at the top end of the shell covering the jacket space between the shell and the liner. An aperture 18 is formed in closure plate 17; and the upper end of liner 4 has a sliding fit in such aperture. In this connection, the annular edge in plate 17 bounding the aperture 18 is provided with an annular groove 19 in which is seated a gasket 21 in the form of a conventional O-ring of rubber or other suitable resilient material, so that when the upper end of liner 4 is telescoped to aperture 18, gasket 21 will automatically effect a seal between the top end of the liner and closure plate 17. Thus, when the liner is inserted into the shell, an efficacious sealing arrangement is provided to preclude escape of heating fluid from the top of jacket space 6; and at the same time, ready insertion or removal of the liner may be effected.

For circulating heated water through the jacket, an inlet pipe 22 is tangentially connected to shell 3 adjacent the lower end thereof at one side of the shell; and an outlet pipe 23 is tangentially connected at the opposite side of the shell adjacent the upper end thereof. Heated water will hence flow through inlet pipe 22, upwardly through jacket space 6, and out through outlet pipe 23. To effect thorough circulation of the water, a series of annularly arranged inclined vanes 24 is secured to shell 3 above inlet pipe 22; and a similar series of like vanes 26 is secured to the inside of shell 3 below outlet pipe 23. The inner edges of vanes 24 and 26 are in the form of arcs having substantially the same but slightly greater radius as the outside radius of liner 4 so that the liner, when inserted or removed, will have a sliding fit with the inner edges of vanes 24 and 26. Means is provided for supporting a tubular mold core or mandrel 27 within and in spaced relationship with respect to liner 4 to provide a cylindrical mold cavity 28 between the outer surface of the core and the inner surface of liner 4. Core 27 is hollow to permit circulation of the heating fluid therethrough, and its upper end is closed by a plug 29. The lower end of core 27 is detachably screwed into a fluid distributing member 31 which is removably mounted within a sleeve 32 on the underside of base plate 9 under jacket 2. Member 31 is detachably secured in position to a keeper plate 33 by cap screws 34; the plate being in turn detachably secured to sleeve 32 by cap screws 36.

A fluid inlet passage 37 is formed in member 31, open at its upper end to the inside of mold core 27, and having a lateral extension 37' which is open to a side of the member 31 and communicates with an aperture in one side of sleeve 32 in which is connected an inlet pipe 38 for heated water. A fluid outlet passage 39 is also formed in fluid distributing member 31 below passage 37, and is also open to a side of member 31 and communicates with an aperture in the opposite side of sleeve 32 in which is connected fluid outlet pipe 41. A pipe 42, extending to a position adjacent the upper end of mold core 27, also extends through inlet passage 37 in fluid distributing member 31, and is detachably screwed into member 31 so as to communicate with outlet passage 39. Thus, heating fluid introduced through inlet pipe 38 will flow upwardly into the interior of mold core 27, then downwardly through pipe 42, and out through outlet pipe 41. Outlet pipe 41 for the heating fluid flowing from the inside of core 27 is preferably connected to the inlet pipe 22 which conducts the heating fluid into mold jacket space 6.

Means is provided for ejecting the set material from the mold. A plunger element 43 in the form of a cylindrical piston sleeve is slidably mounted in mold cavity 28; and a plurality of circumferentially arranged actuating rods 44, also movable in mold cavity 28, are connected to the bottom of piston 43 and extend through passages in fluid distributing member 31 so as to be slidable in such passages. Also, cooperating apertures are provided in keeper plate 33 through which the rods are slidable. As can be seen more clearly from Fig. 4, the passages in member 31 through which rods 44 pass are circumferentially arranged about the member and about fluid inlet passage 37 in such member.

The lower ends of actuating rods 44 are connected to a cross-head 46 in turn mounted on suitable piston actuating mechanism 47 which is movable up and down by any suitable source of power, to move piston 43 up and down. In loading the mold cavity with the slurry to be set, the piston is moved to the lower end of the mold; and after the material has set to a self supporting mass, it is ejected from the upper end of the mold by movement of piston 43 upwardly.

In order to provide substantially perfect mold-smooth surfaces on both the inner and the outer sides of the cylindrical mass being formed, it is necessary that the mold surfaces of mold core 27 and of liner 4 be true and smooth. Hence, these elements may have to be replaced from time to time. By the described construction, the liner can be readily replaced without the necessity of having to replace an entirely new jacket which would otherwise be the case if the liner and shell 3 were a functionally integral structure. Also, since mold core 27 is merely screwed into fluid distributing member 31 and centered by engagement with piston 43, it can be readily replaced by unscrewing thereof from member 31, and insertion of a new element therefor.

In operation, when the slurry is to be set, mold cavity 28 is completely filled with slurry with piston 43 at the lower end of the mold. While the piston is maintained in this position, the mold is heated to set the slurry to a firm self-supporting mass by circulation of heating fluid, such as hot water, through jacket space 6 between shell 3 and liner 4; the heating fluid being introduced into space 6 through inlet pipe 22 and discharged from such space through outlet pipe 23. This results in thorough heating of the outer side of the slurry.

The inner side of the slurry is also maintained heated during the setting thereof in the mold by introduction of heating fluid through inlet pipe 38 from whence it flows from fluid distributing member 31 into tubular mold core 27. The fluid passes from the top of core 27 into pipe 42, and out through outlet pipe 41 also connected to fluid distributing member 31.

After the slurry is set to a firm self-supporting mass, the set product is then ejected from the upper end of the mold by movement of piston 43 upwardly. Upon ejection of the set product, the mold is ready for the next cycle of operation.

Liner 4 and mold core 27 can be replaced from time to time to provide smooth surfaces on both the inner and the outer sides of the cylindrical mass being molded, by disassembly of the mold primarily by removal and replacement of cap screws 10. With the mold parts disassembled, a new liner 4 can be readily telescoped in position in shell 3; and mold core 27 can be replaced by unscrewing thereof from fluid distributing member 31.

I claim:

1. Molding apparatus comprising a jacket including an outer tubular shell having an annular recess in an end thereby and an inner tubular mold liner telescoped within and removably mounted in said shell for endwise removal therefrom and insertion therein, an end of said liner having an annular flange seated in said recess, means clamping said flange in said recess, said shell having an opening for introduction of fluid into the jacket, and a mold core within said liner and spaced therefrom to provide a mold cavity between it and the liner.

2. Molding apparatus comprising a base; a jacket positioned on said base; said jacket including an outer substantially cylindrical shell mounted on said base at its bottom end and having an annular recess in said bottom end, and an inner substantially cylindrical mold liner removably telescoped within said shell, the bottom end of said liner having an annular flange seated in said recess between said base and said bottom end of the shell; said shell having an opening for introduction of fluid into the jacket; and a mold core within said liner and spaced therefrom to provide a mold cavity between it and the liner.

3. Molding apparatus comprising a base; a jacket positioned on said base; said jacket including an outer substantially cylindrical shell mounted on said base at its bottom end and having an annular recess in said bottom end, and an inner substantially cylindrical mold liner removably telescoped within said shell, the bottom end of said liner having an annular flange seated in said recess between said base and said bottom end of the shell; a closure at the top end of said shell covering the space between said shell and said liner; said closure having an aperture in which the top end of the liner has a sliding fit; a sealing ring between the top end of the liner and said closure; a sealing ring adjacent said flange of the liner; said shell having an opening for introduction of fluid into the jacket; a hollow mold core within said liner and spaced therefrom to provide a mold cavity between it and the liner; and means for introducing fluid into the core.

4. Molding apparatus comprising a jacket including an outer tubular shell, an inner tubular mold liner telescoped within and removably mounted in said shell for endwise removal therefrom and insertion therein, a fluid distributing member, a hollow mold core within said liner mounted on said member and spaced from said liner to provide a mold cavity between it and the liner, and means for circulating fluid through said core comprising a fluid inlet passage in said member open to the top and the side of said member, a fluid outlet passage in said member open to the side thereof, and a pipe mounted on said member in communication with said outlet passage and extending into the inside of said core.

5. Molding apparatus comprising a base; a jacket positioned on the top side of said base; said jacket including an outer substantially cylindrical shell removably mounted on said base at its bottom end and having an annular recess in said bottom end, and an inner substantially cylindrical mold liner removably telescoped within said shell, the bottom end of said liner having an annular flange seated in said recess between said base and said bottom end of the shell; a closure at the top end of said shell covering the space between said shell and said liner; said closure having an aperture in which the top end of the liner has a sliding fit; a sealing ring between the top end of the liner and said closure; a sealing ring adjacent said flange of the liner; said shell having an inlet and an outlet for circulation of fluid therethrough; a sleeve on the underside of said base under said jacket; a fluid distributing member in said sleeve; a hollow mold core within said liner mounted on said member and spaced from said liner to provide a mold cavity between it and the liner; means for circulating fluid through said core comprising a fluid inlet passage in said member open to the top and the side of said member in communication, respectively, with the inside of the core and with a fluid inlet aperture in said sleeve, a fluid outlet passage in said member open to the side thereof and communicating with an outlet aperture in said sleeve, and a pipe mounted on said member in communication with said outlet passage and extending into the inside of said core; and means for ejecting molded material from said mold cavity comprising a piston sleeve slidably mounted in said mold cavity, and a plurality of actuating rods connected to said piston sleeve and extending through passages in said fluid distributing member.

6. Molding apparatus comprising a jacket including an outer tubular shell having an annular recess in an end thereof and an inner tubular mold liner telescoped within and removably mounted in said shell for endwise removal therefrom and insertion therein, an end of said liner having an annular flange seated in said recess, means clamping said flange in said recess, said shell having an opening for introduction of fluid into the jacket, a hollow mold core within said liner and spaced therefrom to provide a mold cavity between it and the liner, means for removably mounting said core, and means for introducing fluid into the core.

7. Molding apparatus comprising a base; a jacket positioned on the top side of said base; said jacket including an outer substantially cylindrical shell removably mounted on said base at its bottom end and having an annular recess in said bottom end, and an inner substantially cylindrical mold liner removably telescoped within said shell, the bottom end of said liner having an annular flange seated in said recess between said base and said bottom end of the shell; a closure at the top end of said shell covering the space between said shell and said liner; said closure having an aperture in which the top end of the liner has a sliding fit; a sealing ring between the top end of the liner and said closure; a sealing ring adjacent said flange of the liner; said shell having an inlet and an outlet for circulation of fluid therethrough; a hollow mold core within said liner and spaced from said liner to provide a mold cavity between it and the liner; means for removably mounting said core; and means for introducing fluid into said core.

HARRY P. HOOPES.

REFERENCES CITED

The following references are of record in the file of this patent:

UNITED STATES PATENTS

| Number | Name | Date |
|---|---|---|
| 965,007 | Pauly | July 19, 1910 |
| 1,029,561 | Pauly | June 11, 1912 |
| 1,550,126 | Tompkins | Aug. 18, 1925 |
| 2,189,071 | Kopp | Feb. 6, 1940 |
| 2,211,742 | Halliwell | Aug. 13, 1940 |
| 2,434,690 | Ferla | Jan. 20, 1948 |